S. C. MOORHEAD.
UNIVERSAL JOINT.
APPLICATION FILED AUG. 25, 1915.
1,181,788.
Patented May 2, 1916.
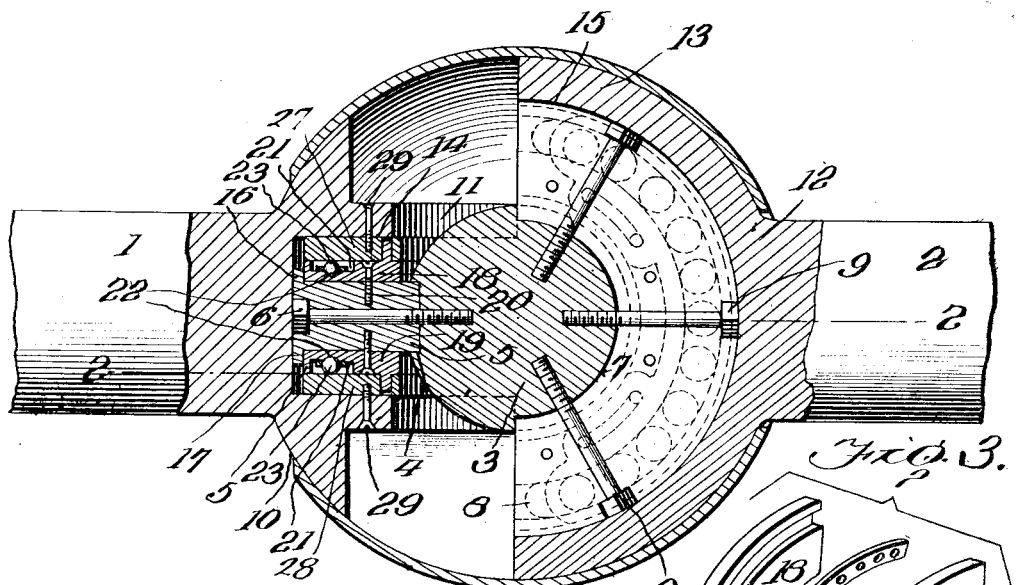
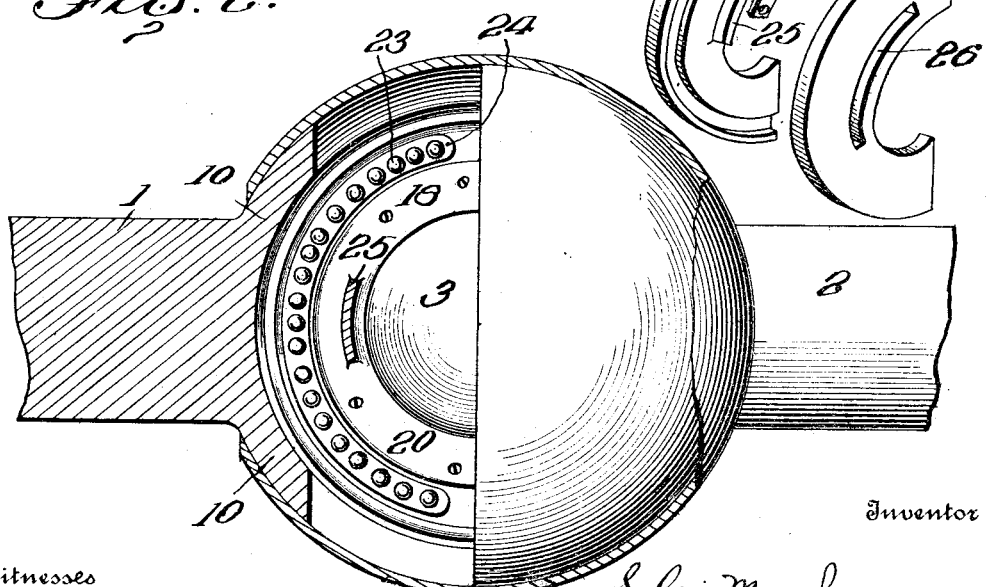

UNITED STATES PATENT OFFICE.

SAMUEL C. MOORHEAD, OF CLEVELAND, OHIO.

UNIVERSAL JOINT.

1,181,788.     Specification of Letters Patent.    Patented May 2, 1916.

Application filed August 25, 1915. Serial No. 47,265.

*To all whom it may concern:*

Be it known that I, SAMUEL C. MOORHEAD, a citizen of the United States, residing at Cleveland, in the county of Cuyahoga and State of Ohio, have invented certain new and useful Improvements in Universal Joints, of which the following is a specification, reference being had therein to the accompanying drawing.

My invention relates to improvements in universal joints.

The object of my invention is to provide a universal joint for coupling the two ends of the shaft together, and providing means whereby the wearing parts may be readily replaced when worn, thus avoiding the throwing away of the entire joint as is the case in my universal joint covered by Patent No. 961,634.

Another object of my invention is to provide a universal joint in which the parts are readily assembled and removed and at the same time providing a simple, cheap and effective joint and also providing means whereby the necessary lubricant can be maintained therein.

In the accompanying drawings, Figure 1 is a vertical longitudinal sectional view of my improved universal joint. Fig. 2 is a sectional view taken on the line 2—2 of Fig. 1. Fig. 3 is a perspective view of the removable wearing plate.

Referring now to the drawings, 1 and 2 represent the two ends of the shafts to be connected by my improved universal joint, whereby either may be moved out of alinement with the other, as is well understood in universal joints of this character.

My improved connecting member consists of a central member 3 which is preferably of a round ball-like form and having in one side a circular groove 4 in which is located the semi-circular member 5 secured therein by means of the bolts 6. The opposite side of the ball-like member 3 is provided with a semi-circular groove 7 extending at right angles to the groove 4, and has secured therein the semi-circular member 8 by means of screws 9, as fully shown in Fig. 1 of the drawing.

In my former patent the members 3, 5 and 8 were made integral, and thus when they became worn, the entire joint had to be thrown away as there was no way of replacing the worn parts. It is the object of this present invention to avoid these difficulties found in my Patent No. 961,634, whereby any of the worn parts can be readily removed and replaced.

The end of the shaft 1 is provided with a spherical shaped portion 10 carrying the semi-circular member 11, corresponding to the semi-circular member 5, as will be later described. The end of the shaft 2 is provided with a spherical-shaped member 12 carrying the semi-circular member 13 which is arranged at right angles to the semi-circular member 11. As heretofore described, the semi-circular members 5 and 8 are arranged at right angles to each other, and are removably secured to the central portion 3 by means of the bolts 6 and 9. The semi-circular members 11 and 13 are provided with semi-circular sections 14 and 15 into which the members 5 and 8 extend, and thus the two ends of the shaft 1 and 2 are allowed to have a vertical or a horizontal movement in respect to each other. The semi-circular member 5 is provided at its outer end with the flanges 16 and 17, and secured to the flat faces of the said member 5 are the wearing plates 18 and 19. These wearing plates, as shown, are of a semi-circular form and secured to the member 5 by means of screws 20, fully shown in Fig. 1 of the drawings. The outer faces of the wearing plates 18 and 19 are provided with recesses 21, which have ball-races 22 in their bottom and in which the ball-bearings 23 are adapted to travel. The balls 23 are held by retainer rings 24 which allows the balls to be readily removed, and also allows of the more ready assembling of the different parts. The wearing plates 18 and 19 adjacent their inner edge are provided with outwardly extending circular shaped lugs 25 which enter circular grooves 26 in the wearing plates 27 and 28. These wearing plates 27 and 28 are placed in position on the plates 18 and 19 and the same inserted into the groove 14 in the member 11, and the wearing plates 27 and 28 are secured to the member 11 by means of screws 29. By this arrangement, it will be seen that the member 5 is locked within the member 11 against outward movement, but is free to oscillate therein in one direction. The wearing plates carried by the member 8 which as heretofore described, extends at right angles to the member 5, are arranged in precisely the same manner, and therefore, I will not describe the same in detail. By this arrangement it will be seen that the entire wear is neither upon the plates nor upon the balls 23. The two wearing plates are in engagement with each other, and the balls are likewise in engagement with the plates, and thus a greater wearing surface is obtained which sufficiently reduces the friction between the plates to allow of a free movement of the member 5 within the member 11.

While I have shown and described this specific manner of securing and arranging the wearing plates on the members 5 and 8, it will be understood that the same could be varied without departing from my invention.

Having thus fully described my invention what I claim and desire to secure by Letters Patent is:

1. A universal joint comprising a central connecting member having two semi-circular plates, shaft sections having pockets receiving the plates, wearing plates carried by the semi-circular plates and the pockets, and bearing balls between the plates adapted to receive a portion of the wear between the plates.

2. A universal joint comprising a central connecting member formed of two semi-circular plates, wearing plates secured on opposite sides thereof concentric with the periphery thereof, shaft sections having pockets receiving the semi-circular plates and having wearing plates removably secured within the pockets and one of the wearing plates having bearing balls, whereby a portion of the wear is taken up by the ball bearing.

3. A universal joint comprising a central connecting member having two semi-circular plates, wearing plates removably secured on opposite sides concentric with the periphery thereof, shaft sections having pockets receiving the semi-circular plates and having wearing plates removably secured thereto, said wearing plates being carried by the pockets and semi-circular plates for interlocking the members.

4. A universal joint comprising a central connecting member having two semi-circular plates, wearing plates removably secured to the sides concentric with the periphery thereof, shaft sections having pockets receiving the semi-circular plates, wearing plates removably secured within the pockets and bearing against the plates carried by the semi-circular plates, one of the wearing plates having a ball-race and balls carried thereby, substantially as shown and described.

5. A universal joint comprising a central connecting member having two semi-circular plates arranged at right angles to each other, wearing plates on opposite sides concentric with the periphery thereof, shaft sections having a pocket receiving the semi-circular plates, wearing plates carried by the pockets and bearing against the wearing plates carried by the semi-circular plates, one of the wearing plates having a ball race and balls carried thereby, substantially as shown and described.

6. A universal joint comprising a central connecting member having two semi-circular plates secured together at right angles to each other, wearing plates secured on opposite sides of the plates concentric with the periphery thereof, shaft sections having pockets receiving the semi-circular plates, wearing plates secured within the pockets and bearing against the wearing plates carried by the semi-circular plates, the wearing plates carried by the semi-circular plates and the pockets having a ball-race with balls carried thereby, substantially as shown and described.

7. A universal joint comprising a central connecting member having two semi-circular plates removably secured thereto at right angles to each other, wearing plates secured on opposite sides thereof concentric with the periphery thereof, shaft sections having pockets receiving the semi-circular plates, wearing plates within the pockets and bearing against the wearing plates carried by the semi-circular plates, and a ball-race with balls carried thereby carried by the plates of the semi-circular plates and the pockets, substantially as shown and described.

8. A universal joint comprising a central connecting member having grooves in its outer periphery on opposite sides and arranged at right angles to each other, semi-circular plates removably secured within said plates, shaft sections having pockets receiving the plates, and means for locking the semi-circular plates within the pockets.

9. A universal joint comprising a central connecting member having semi-circular grooves in its opposite sides arranged at right angles to each other, semi-circular plates removably secured in said grooves, shaft sections having pockets receiving the semi-circular plates, removable friction plates carried by the semi-circular plates and the pockets and said plates having interlocking means for limiting the movement thereof.

10. A universal joint comprising a central connecting member having circular grooves on opposite sides extending at right angles to each other, semi-circular plates secured within said grooves, wearing plates removably secured to the opposite sides of the plates concentric with the periphery thereof, shaft sections having pockets receiving the plates, wearing plates carried by the pockets and bearing against the wearing plates carried by the circular plates, said plates having interlocking means for limiting the movement thereof.

11. A universal joint comprising a central connecting member, two semi-circular plates secured thereto at right angles to each other, wearing plates secured on opposite sides of the semi-circular plates concentric with the periphery thereof, and having ball races, shaft sections having pockets receiving the semi-circular plates, wearing plates removably secured within the sockets and having a segmental slot receiving a tongue carried by the wearing plates carried by the semi-circular plates, substantially as shown and described.

12. In a universal joint comprising a central connecting member having two semi-circular plates, shaft sections having pockets receiving the plates, wearing plates carried by the semi-circular plates and the pockets and engaging each other, and a ball race having balls engaging the wearing plates, substantially as shown and described.

13. A universal joint comprising a central connecting member having two semi-circular plates, wearing plates secured to the sides concentric with the periphery thereof, shaft sections having pockets receiving the semi-circular plates, wearing plates removably secured within the pockets and bearing against the plates carried by the semi-circular plates, one of the wearing plates having a ball race and a ball container within the race, and adapted to engage the wearing plates whereby the wearing plates and the ball bearing simultaneously take up the wear in the movement of the members.

14. A universal joint comprising a central connecting member having two semi-circular plates, shaft sections having pockets receiving the plates, wearing plates carried by the semi-circular plates and the pockets and in engagement with each other, and ball bearings between the plates and adapted to take a portion of the wear between the two wearing plates.

15. A universal joint comprising a central connecting member having grooves on opposite sides extending at right angles to each other, semi-circular plates secured within said grooves, wearing plates removably secured to the opposite sides of the plate concentric with the periphery thereof, shaft sections having pockets receiving the plates, wearing plates carried by the pockets and bearing against the wearing plates carried by the circular plates, said plates having interlocking means for limiting the movement thereof, and ball bearings retained within one of the wearing plates and engaging the other wearing plates and adapted to take a portion of the wear simultaneously with the wear on the sides of the plate.

In testimony whereof I hereunto affix my signature in the presence of two witnesses.

SAMUEL C. MOORHEAD.

Witnesses:
  Mrs. J. W. Settle,
  Mrs. G. H. Simmonds.